United States Patent
You et al.

(10) Patent No.: US 8,593,601 B2
(45) Date of Patent: Nov. 26, 2013

(54) DISPLAY PANEL AND METHOD FOR MANUFACTURING THE SAME

(75) Inventors: Doo-hwan You, Gwangmyeong-si (KR);
Young-je Cho, Cheonan-si (KR);
Byoung-jun Lee, Cheonan-si (KR);
Jun-pyo Lee, Cheonan-si (KR);
Sang-youn Han, Cheonan-si (KR);
Hyeong-jun Park, Cheonan-si (KR);
Yun-seok Lee, Cheonan-si (KR);
Sang-gun Choi, Suwon-si (KR);
Hyun-duck Son, Yongin-si (KR)

(73) Assignee: Samsung Display Co., Ltd. (KR)

( * ) Notice: Subject to any disclaimer, the term of this patent is extended or adjusted under 35 U.S.C. 154(b) by 46 days.

(21) Appl. No.: 13/449,802

(22) Filed: Apr. 18, 2012

(65) Prior Publication Data

US 2012/0200815 A1     Aug. 9, 2012

Related U.S. Application Data

(63) Continuation of application No. 12/037,583, filed on Feb. 26, 2008, now Pat. No. 8,184,256.

(30) Foreign Application Priority Data

Dec. 28, 2007 (KR) .......................... 10-2007-0140358

(51) Int. Cl.
    *G02F 1/1337*     (2006.01)
(52) U.S. Cl.
    USPC .......... 349/123; 349/155; 349/156; 349/160; 345/173; 345/174; 178/18.03

(58) Field of Classification Search
    USPC ........... 349/123, 155, 156, 160; 345/173, 174
    See application file for complete search history.

(56) References Cited

U.S. PATENT DOCUMENTS

| | | | |
|---|---|---|---|
| 6,501,529 B1 * | 12/2002 | Kurihara et al. | 349/160 |
| 7,295,271 B2 | 11/2007 | Nakamura et al. | |
| 2003/0043334 A1 * | 3/2003 | Sato et al. | 349/156 |
| 2005/0243263 A1 * | 11/2005 | Yoon | 349/156 |
| 2007/0040964 A1 * | 2/2007 | Shohara et al. | 349/106 |
| 2007/0076161 A1 * | 4/2007 | Morii | 349/155 |
| 2008/0211975 A1 | 9/2008 | Sera | |
| 2009/0322698 A1 | 12/2009 | Hirakata et al. | |
| 2010/0045906 A1 | 2/2010 | Tokuda et al. | |

FOREIGN PATENT DOCUMENTS

| | | | | |
|---|---|---|---|---|
| JP | 2001075074 | | 3/2001 | |
| JP | 2007-052368 | * | 3/2007 | ............ G02F 1/1333 |
| JP | 2007052368 | | 3/2007 | |
| KR | 10-2007-0067960 | * | 6/2007 | ............ G02F 1/1339 |
| KR | 1020070067960 | | 6/2007 | |

* cited by examiner

*Primary Examiner* — Edward Glick
*Assistant Examiner* — Sang V Nguyen
(74) *Attorney, Agent, or Firm* — Cantor Colburn LLP

(57) ABSTRACT

A display panel and a method for manufacturing the same are disclosed. The display panel includes: a first substrate, a touch spacer formed on a first substrate, a common electrode formed on the touch spacer, a second substrate opposing the first substrate, a sensing electrode facing the touch spacer on the second substrate and an alignment layer on the sensing electrode or the touch spacer, wherein the alignment layer has a thickness equal to or less than 500 Å.

8 Claims, 7 Drawing Sheets

DISPLAY PANEL AND METHOD FOR MANUFACTURING THE SAME

CROSS REFERENCE TO RELATED APPLICATION

This application is a continuation of U.S. patent application Ser. No. 12/037,583, filed on Feb. 26, 2008, which claims priority from Korean Patent Application No. 10-2007-0140358, filed on Dec. 28, 2007 in the Korean Intellectual Property Office, all the benefits accruing therefrom under the entire contents of which are incorporated by reference.

BACKGROUND

1. Field of the Invention

The present invention relates to a display panel in which input sensitivity is improved for efficiently detecting the input coordinate values of a touch by a user.

2. Description of the Related Art

A touch screen panel is an information input means which inputs information when a user touches a screen. The touch screen panel is installed on an image display surface of a display device such as a liquid crystal display (LCD) device, a field emission display (FED) device, a plasma display panel (PDP) device, and an electro luminescence (ELD) device.

The touch screen panel is greatly classified into a capacitive touch screen panel and a resistive touch screen panel. The capacitive touch screen panel has one transparent conductive film or glass for storing electrical charges. When the touch screen panel is touched by, e.g., a stylus, a small amount of charge is drawn to a contact point between the stylus and the transparent conductive film. The amount of charge detected at the contact point is converted into coordinate values. In the resistive touch screen panel, if a user touches a screen in a state that a voltage is applied to two opposite conductive layers, the two conductive layers contact, and a change in voltage or electrical current occurs at the contact point. The change in voltage or electrical current is detected and converted into coordinate values.

In case of the capacitive touch screen panel, electricity should be supplied to a stylus. For this reason, the resistive touch screen panel of an analog input method, which is constructed integrally with an LCD panel, is usually used. The resistive touch screen panel may be formed inside an LCD panel in order to prevent brightness of the LCD panel from being degraded.

In an LCD panel with an integrated touch screen panel, first touch conductive lines and second touch conductive lines are formed in a matrix form in a thin film transistor (TFT) array substrate so that a first coordinate value which represents a horizontal contact point and a second coordinate value which represents a vertical contact point can be detected. Also, a touch spacer which contacts the first and second touch conductive lines is formed in a color filter array substrate. In case of a conventional LCD panel with an integrated touch screen panel, there is a problem in that detecting error is frequently caused because the touch sensitivity is low when the touch spacer is contacting the thin film transistor array substrate. When too much pressure is used to compensate for the low sensitivity, the panel reliability degrades.

SUMMARY

Aspects of the invention provide a display panel in which input sensitivity is improved by controlling the thickness of the alignment layer and coordinate values for a touch point can be accurately detected. Small touch pressure can be detected easily with this improved sensitivity and this is very helpful to the reliability of the display panel.

In an exemplary embodiment, the present invention provides a display panel, including: a touch spacer formed on a first substrate, a common electrode formed on the touch spacer, a second substrate opposing the first substrate, a sensing electrode facing the touch spacer on the second substrate and an alignment layer on the sensing electrode or the touch spacer, wherein the alignment layer has a thickness equal to or less than 500 Å.

The alignment layer of the area other than the sensing electrode area and touch spacer area has a thickness of more than 500 Å.

There are at least two touch spacers facing the sensing electrode. Each of the touch spacer includes an embossing surface or a protrusion portion on the surface.

In another exemplary embodiment, the present invention provides a display panel having: a touch spacer formed on a first substrate, a common electrode formed on the touch spacer, a second substrate opposing the first substrate, a sensing electrode facing the touch spacer on the second substrate and an alignment layer on the sensing electrode or the touch spacer, wherein the alignment layer has a non-uniform thickness.

There is no alignment layer region on the touch spacer.

There are two or more touch spacers facing the sensing electrode. Each of the touch spacers includes an embossing surface or a protrusion portion on the surface.

The nearest portion of the touch spacer to the sensing electrode has a thinner alignment layer than other portions of the touch spacer.

In another exemplary embodiment, the present invention provides a method for manufacturing a display panel including: forming a touch spacer on the insulating substrate, forming a common electrode on the touch spacer and forming a alignment layer on the common electrode, wherein the alignment layer on the touch spacer has a different thickness than the portions of the alignment layer not on the touch spacer.

The alignment layer on the touch spacer is thinner than the alignment layer on the other portions of the alignment layer.

The alignment layer thickness is controlled by an ink jet printing method.

BRIEF DESCRIPTION OF THE DRAWINGS

The above and/or other aspects, features and advantages of the present invention will become more apparent from the following detailed description when taken in conjunction with the accompanying drawings, in which.

DETAILED DESCRIPTION

Figure 1:
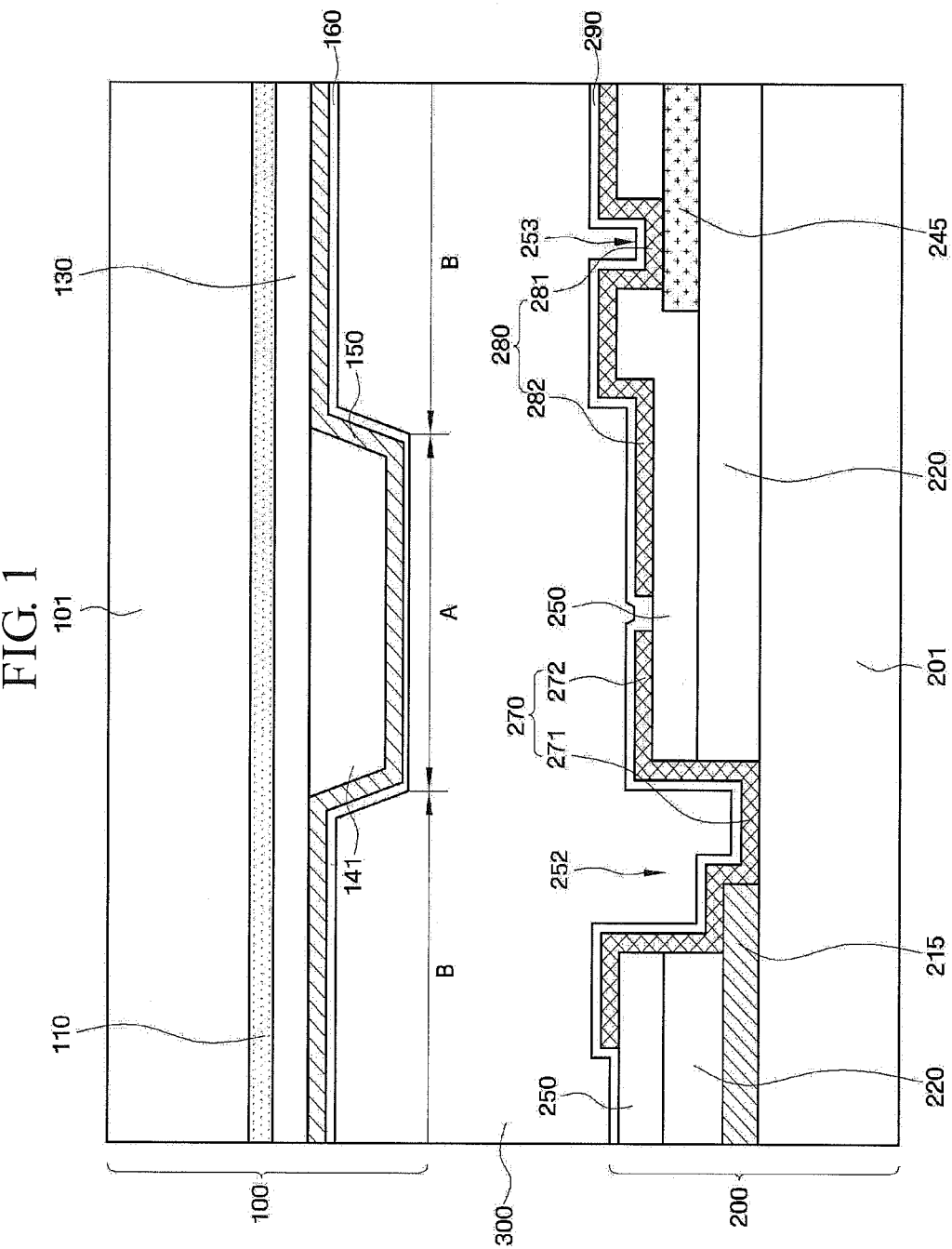
FIG. 1 is a cross-sectional view illustrating a sensing portion in a display panel according to an exemplary embodiment of the present invention.

The invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" other elements or features would then be oriented "above" or "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 2:
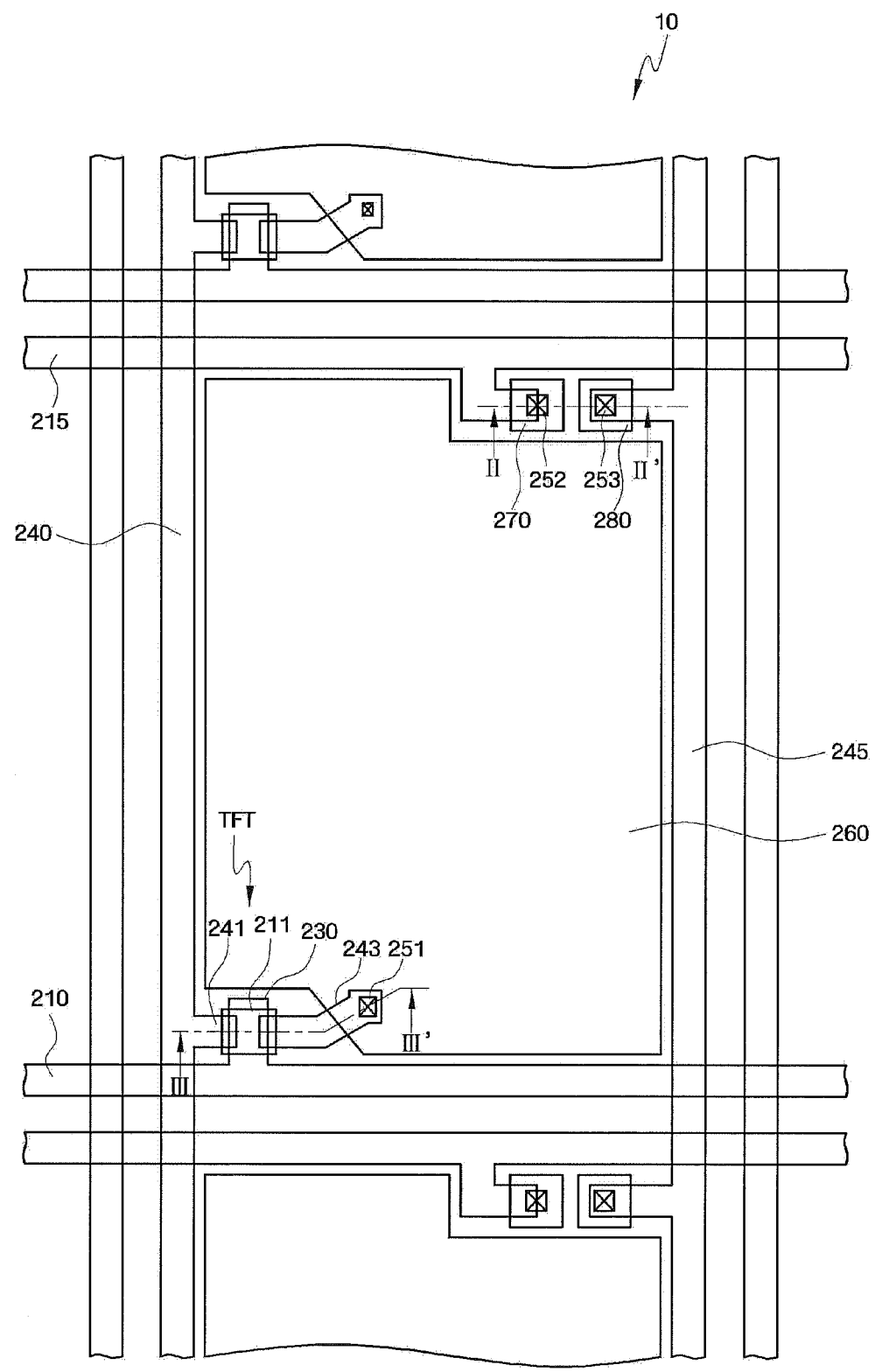
FIG. 2 is a plan view of display panel according to an exemplary embodiment of the present invention.
Figure 3:
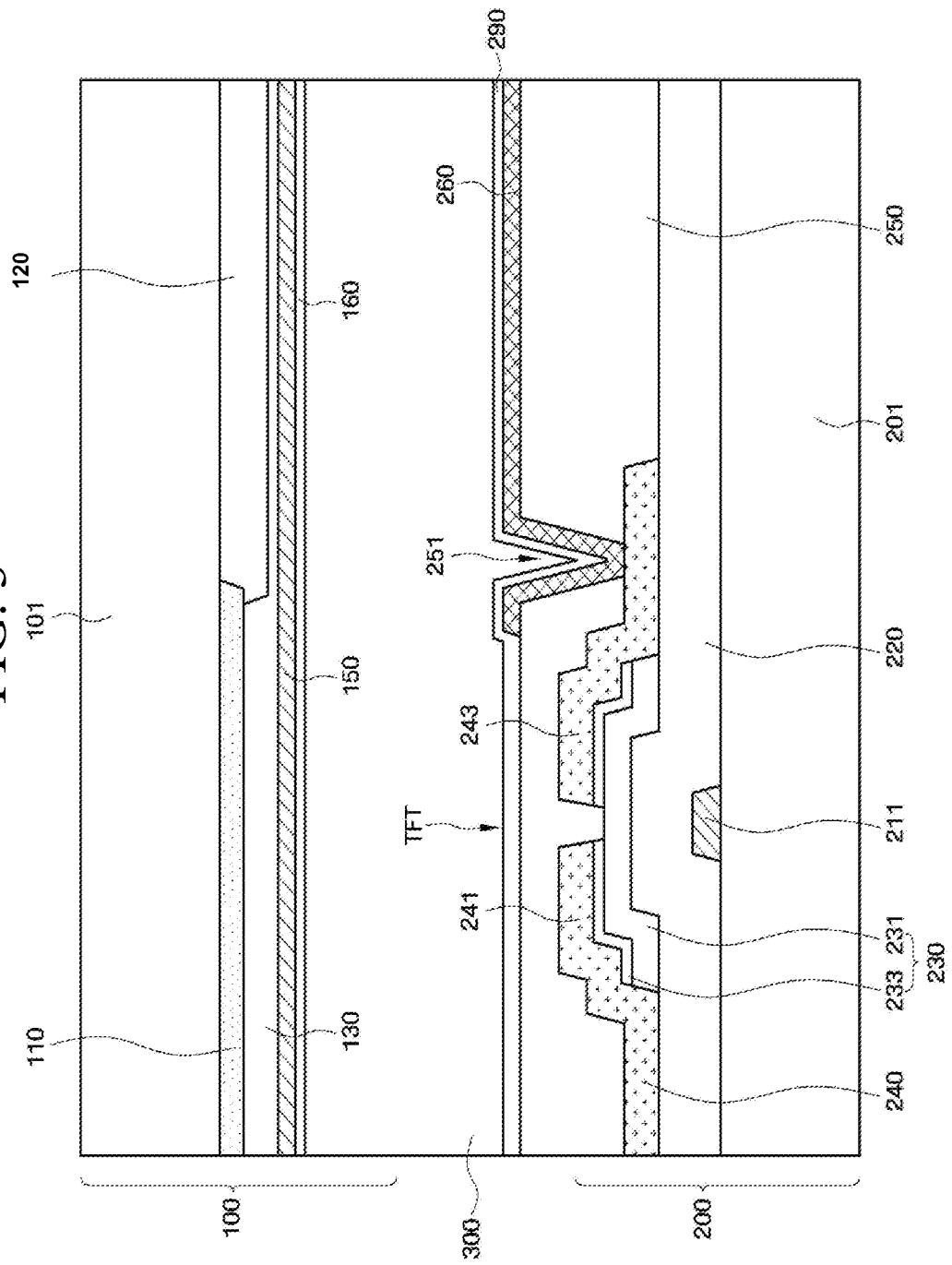
FIG. 3 is a cross-sectional view taken along line II-II' of FIG. 2.

FIG. 1 is a cross-sectional view illustrating a sensing portion in a display panel according to an exemplary embodiment of the present invention, FIG. 2 is a plan view of a display panel according to an exemplary embodiment of the present invention and FIG. 3 is a cross-sectional view taken along line II-II' of FIG. 2.

Referring to FIGS. 1 to 3, the display panel according to an exemplary embodiment of the present invention includes an upper substrate 101 and a lower substrate 201 with a liquid crystal layer interposed therebetween.

The upper substrate 101 includes a black matrix 110 for preventing a light leakage, a color filter layer 120 for realizing a color image, an overcoat layer 130 for mitigating a step difference between the black matrix 110 and the color filter layer 120, and a common electrode 150 for applying a common voltage to the liquid crystal layer, which are sequentially formed on an upper substrate 101.

The upper substrate 101 may be made of a transparent insulating material such as plastic so that it can be smoothly pushed when a user touches its surface. And the upper substrate 101 may be made of a transparent insulating material such as glass.

The black matrix 110 is formed to overlap a TFT. A gate line 210, a data line 240 and first and second touch conductive lines 215 and 245 are formed on the second substrate in order to prevent light from being emitted through regions where liquid crystal molecules can not be controlled. To this end, the black matrix 110 is made of an opaque organic material or an opaque metal.

The color filter layer 120 includes red (R), green (G) and blue (B) color filters to create various colors. The red (R), green (G) and blue (B) color filters create red, green and blue colors by absorbing and transmitting light of a certain wavelength through red, green and blue pigments contained therein, respectively. At this time, various colors can be realized by an additive color mixture of the red (R), green (G) and blue (B) light which pass through the red (R), green (G) and blue (B) color filters.

The overcoat layer 130 is made of a transparent organic material for step coverage and insulation of the common electrode 150. The overcoat layer 130 also serves to protect the color filter layer 120 and the black matrix 110.

The common electrode 150 is formed on the overcoat layer 130. The common electrode 150 is made of a transparent conductive metal such as indium tin oxide (ITO) or indium zinc oxide (IZO). The common electrode 150 forms an electrical field for driving the liquid crystal layer together with a pixel electrode 260 by applying a common voltage to the liquid crystal layer as the pixel electrode 260 applies a pixel voltage to the liquid crystal layer.

The first substrate further includes a touch spacer 141 formed between the overcoat layer 130 and the common electrode 150. That is, the touch spacer 141 is formed on the overcoat layer 130 and is covered with the common electrode 150. The touch spacer 141 has a predetermined height, i.e., a convex shape so that the common electrode 150 contacts first and second sensing electrodes 270 and 280 of the second substrate when a surface of the upper substrate 101 is touched by a user's finger or a stylus pen. A predetermined gap is kept between the touch spacer 141 and the first and second sensing electrodes 270 and 280 until a user touches a surface of the upper substrate 101. Also, when a user touches a surface of the upper substrate 101, the touch spacer 141 has the common electrode 150 to contact the first and second sensing electrodes 270 and 280 so that the contact point can be detected.

Preferably, the touch spacer 141 is made of a conductive material so that a voltage or an electrical current can be applied between the common electrode 150 and the first and second sensing electrodes 270 and 280 when the common electrode 150 gets damaged.

An alignment layer 160 to orientate liquid crystal molecules is formed on the common electrode 150. The alignment layer may be made of an organic material or inorganic material. The thickness of the alignment layer 160 may be equal to or less than 500 Å for better detecting the current flow when the touch spacer 141 contacts the sensing electrode 270 and 280 in the second substrate. As the thickness of the alignment layer, which is made from an insulating material, becomes thicker, the touch sensitivity of the touch spacer 141 and the sensing electrode degrades. This causes a touch sensing error. If this touch sensing error occurs, the user will push with extra pressure on the panel, and if this extra pressure is repeated, the touch spacer 141 and the sensing electrode 270 and 280 will be damaged and may collapse. Thus, the reliability of the display panel may degrade.

According to test results, when the thickness of the alignment layer is 500 Å and the thickness of the glass substrate is 0.5 mm, a touch pressure of even 10~60 gf is detected. But when the thickness of the alignment layer is 1000 and the thickness of the glass substrate is 0.2 mm thin glass, a touch pressure of 70~700 gf is needed to detect the touches.

The second substrate includes the gate line 210, the first touch conductive line 215, the data line 240, the second touch conductive line 245, the TFT, the pixel electrode 260, and the first and second sensing electrodes 270 and 280 which are formed on a lower substrate 201.

The gate line 210 is formed in the lower substrate 201 in a first direction, e.g., a transverse direction. The gate line 210 may have a single-layer structure or a multi-layer structure made of molybdenum (Mo), niobium (Nb), copper (Cu), aluminum (Al), chromium (Cr), silver (Ag), tungsten (W), titanium (Ti) or their alloy. A gate electrode 211 extends from the gate line 210 near a crossing point of the gate line 210 and the data line 240.

The first touch conductive line 215 is formed in the first direction parallel with the gate line 210 and is separate from the gate line 210. The first touch conductive line 215 may be made of the same material as the gate line 210.

The data line 240 is formed in the lower substrate 201 in a second direction perpendicular to the first direction, e.g., a vertical direction. The data line 240 crosses the gate line 210. The data line 240 may have a single-layer structure or a multi-layer structure made of Mo, Nb, Cu, Al, Cr, Ag, titanium (Ti), or other alloys.

The second touch conductive line 245 is formed in the second direction parallel with the data line 240 and is apart from the data line 240. The second touch conductive line 245 may be made of the same material as the data line 240.

The TFT performs a switching operation in response to a gate signal transmitted from the gate line 210 so that a pixel voltage signal of the data line 240 may be charged and maintained in the pixel electrode 260. To this end, the TFT includes the gate electrode 211 extending from the gate line 210, a source electrode 241 extending from the data line 240, and a drain electrode 243 apart from the source electrode 241 and electrically connected to the pixel electrode 260.

The TFT further includes a gate insulating layer 220 and a semiconductor layer 230. The gate insulating layer 220 is formed over the whole surface of the lower substrate 201 to cover the gate electrode 211. The semiconductor layer 230 is formed on a portion of the gate insulating layer 220 above the gate electrode 211 to form a channel between the source electrode 241 and the drain electrode 243.

The semiconductor layer 230 includes an active layer 231 and an ohmic contact layer 233. The active layer 231 is formed to have a channel between the source and drain electrodes 241 and 243, overlapping the gate electrode 211. The ohmic contact layer 233 is formed on the active layer 231 for ohmic contact with the data line 240 and the source and drain electrodes 241 and 243.

The second substrate 200 further includes a passivation film 250 formed over the whole surface of the lower substrate 201. The passivation film 250 is made of an inorganic insulating material, such as silicon nitride (SiNx) or silicon oxide (SiOx), or an organic insulating material, such as acrylic, polyimide or benzocyclobutene (BCB). The passivation film 250 may have a single-layer structure or a multi-layer structure made of an organic insulating material or/and an inorganic insulating material. The passivation film 250 is formed to cover the TFT and the gate insulating layer 220, thereby insulating the TFT 247 from the pixel electrode 260.

The passivation film 250 has first to third contact holes 251 to 253 which expose a portion of the drain electrode 243 and portions of the first and second touch conductive lines 215 and 245, respectively. The first to third contact holes 251 to 253 are formed by etching corresponding portions of the passivation film 250 through a mask process.

The pixel electrode 260 is formed on the passivation film 250. The pixel electrode 260 is electrically connected to the drain electrode 243 of the TFT 247 via the first contact hole 251. The pixel electrode 260 is made of a transparent conductive material such as ITO, IZO, indium tin zinc oxide (ITZO), or tin oxide (TO).

The first sensing electrode 270 includes a first electrode contact portion 271 which electrically contacts the first touch conductive line 215 and a first electrode extending portion 272 which extends from the first electrode contact portion 271. The second sensing electrode 280 includes a second electrode contact portion 281 which electrically contacts the second touch conductive line 245 and a second electrode extending portion 282 which extends from the second electrode contact portion 281. The first and second electrode extending portions 272 and 282 have various shapes. The first and second electrode extending portions 272 and 282 may be alternately formed or symmetrically formed as if they engage each other.

The first electrode contact portion 271 of the first sensing electrode 270 is electrically connected to the first touch conductive line 215 via the second contact hole 252 which penetrates the passivation film 250 and the gate insulating layer 220. The first electrode extending portion 272 of the first sensing electrode 270 is formed on the passivation film 250 in a predetermined pattern to face the second sensing electrode 280.

The second electrode contact portion 281 of the second sensing electrode 280 is electrically connected to the second touch conductive line 245 via the third contact hole 253 which penetrates the passivation film 250. The second electrode extending portion 282 of the second sensing electrode 280 is formed on the passivation film 250 in a predetermined pattern to face the first sensing electrode 270. Here, the second electrode extending portion 282 is formed on the passivation film 250 at the same height as the first electrode extending portion 272 of the first sensing electrode 270. Therefore, when the panel is touched, the touch spacer 141 equally contacts the first and second sensing electrodes 270 and 280.

The alignment layer 290 is formed on the sensing electrodes 270 and 280 and pixel electrode 260. The alignment layer 290 is in this embodiment of the invention is the uppermost layer in the second substrate and is evenly formed to prevent disorientation of the liquid crystal molecules. The alignment layer 290 may be made of an inorganic material or organic material. As explained above, the thickness of the alignment layer may be equal to or less than 500□. This is to better detect the current when the touch spacer contacts the sensing electrodes 270 and 280. When the thickness of the alignment layer, which is an insulating material, is thicker, the sensing signal is less likely to be detected by contacting the touch spacer 141 and the sensing electrode. This may cause a touch sensing error.

In the display panel according to the exemplary embodiment of the present invention, when the upper substrate 101 is touched by a user's finger or a stylus pen, the first and second contact electrodes 270 and 280 contact through the touch spacer 141, so that a resistance value varies depending on a contact position. Since an electrical current or voltage depends on the varied resistance value, the detected electrical current or voltage is outputted as a horizontal coordinate signal through the first touch conductive line 215 and as a vertical coordinate signal through the second touch conductive line 245. The outputted coordinate signals are converted into coordinate values by a driving circuit, so that a command or an application program corresponding to the measured coordinate values is executed.

Various forms of touch spacers and various alignment layers are explained below referring to the FIGS. 4 to 7.

Figure 4:
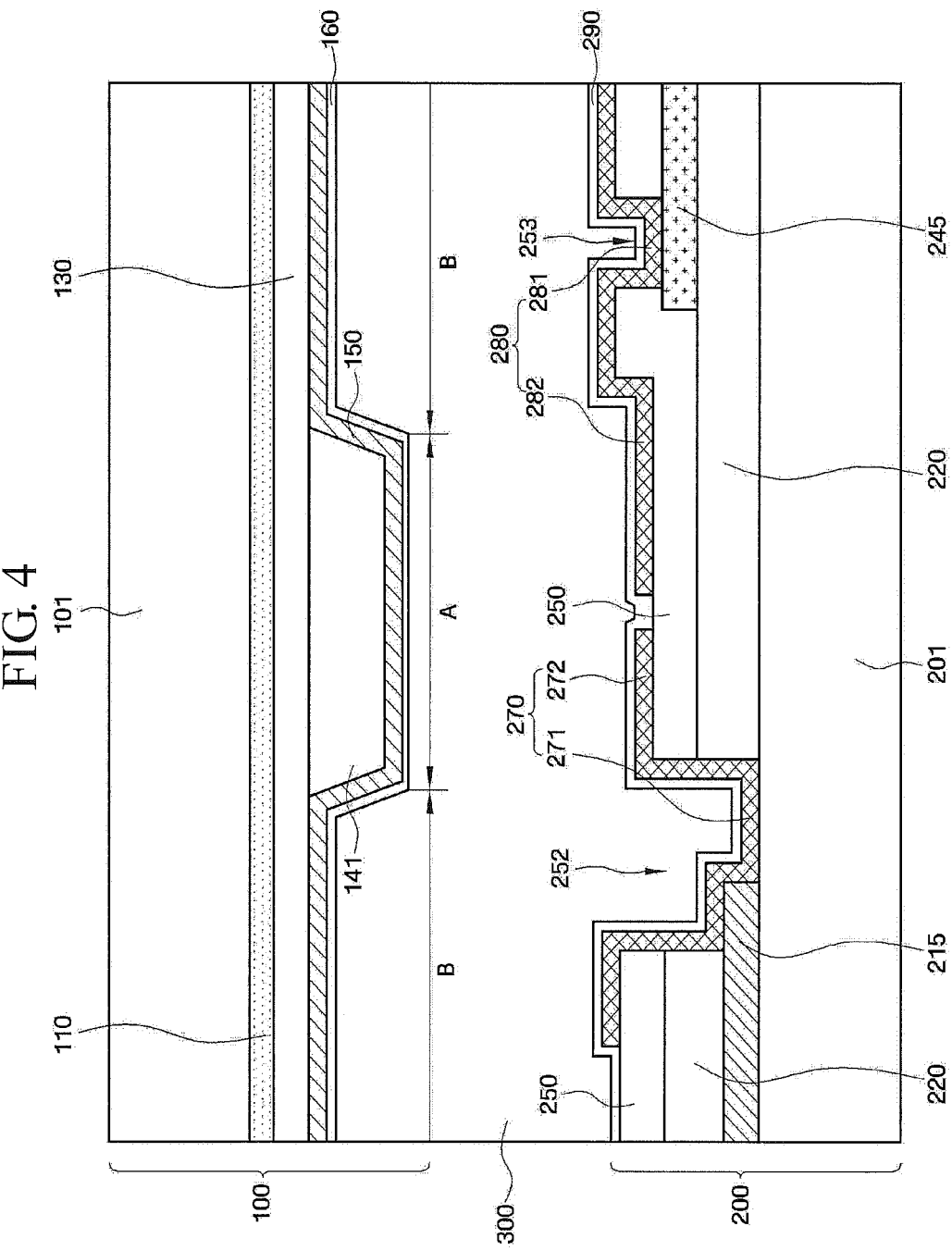
FIG. 4 is a cross-sectional view illustrating a sensing portion of a display panel according to the first exemplary embodiment of the present invention.

FIG. 4 is a cross-sectional view illustrating a sensing portion in a display panel according to the first exemplary embodiment of the present invention. Referring to the FIG. 4, the alignment layers 160 and 290 on the touch spacer 141 and sensing electrodes 270 and 280 are thinner than the other portion than the touch spacer and sensing electrodes. The contact points, which are on the touch spacer and sensing electrodes having a touch event, are covered by thin alignment layer having a thickness equal to or less than 500 Å. Alternatively, the other portions, not including the touch spacer and sensing electrodes, have a thicker alignment layer than the portion on the touch spacer and the sensing electrodes. This thin alignment layer on the touch spacer and the sensing electrodes improve the contact between the touch spacer and the sensing electrodes, so the sensitivity of the touch event is improved. For example, when the alignment layer is formed, an ink jet printing method may be used. On the touch spacer and the sensing electrode, the thickness of the alignment layer equal to or less than 500 Å is formed and on the other portions, not including the touch spacer and the sensing electrode, the thickness of the alignment layer lager than 500 Å, e.g. 1000 Å, is formed by ink jet printing method in some embodiments of the invention.

Figure 5:
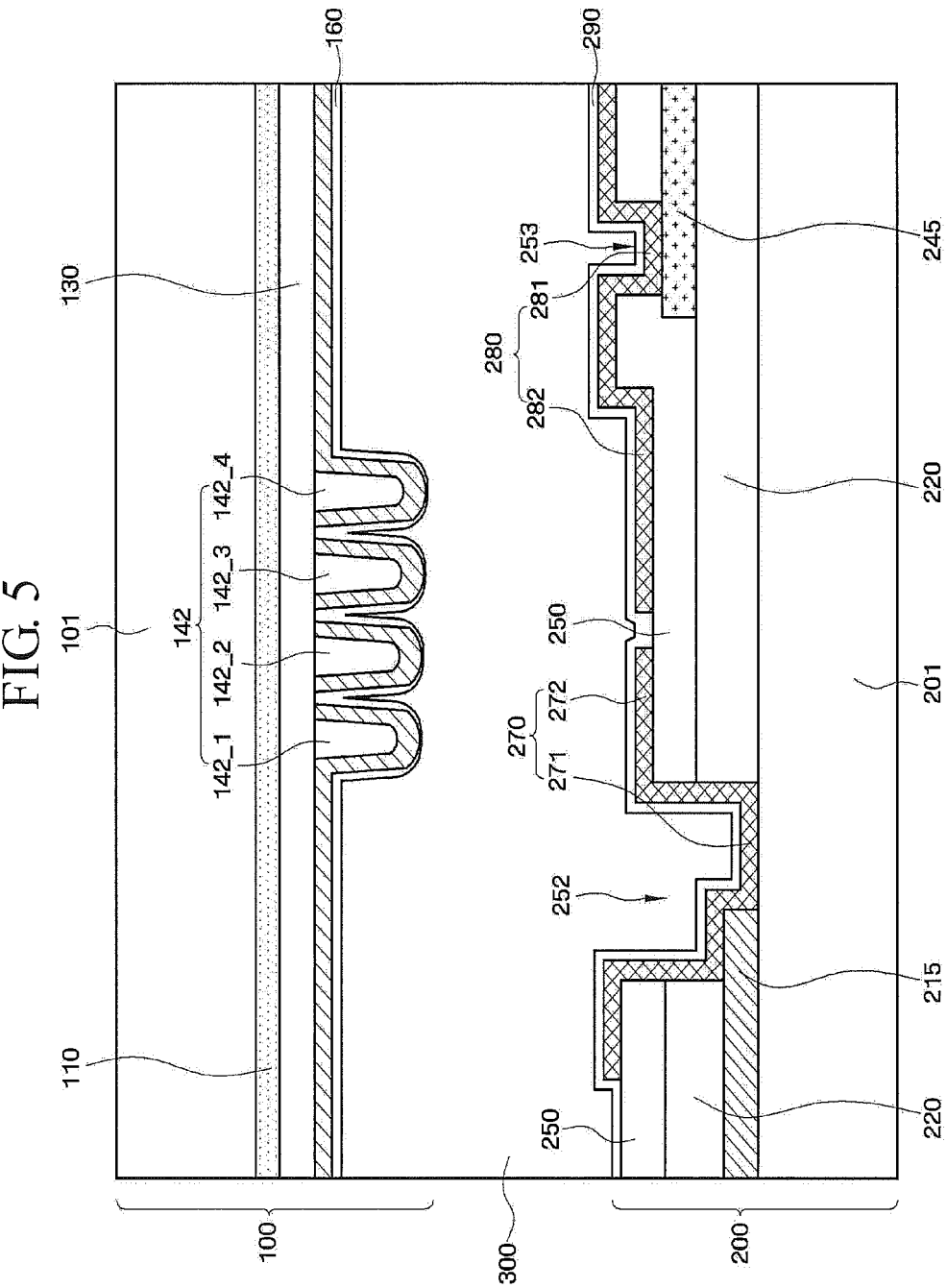
FIG. 5 is a cross-sectional view illustrating a sensing portion of a display panel according to the second exemplary embodiment of the present invention.

FIG. 5 is a cross-sectional view illustrating a sensing portion in a display panel according to the second exemplary embodiment of the present invention. Referring to FIG. 5, the touch spacer includes more than two columns. Because the touch spacer facing the sensing electrodes 270 and 280 includes more than two columns, the touch spacer contacts the smaller area of sensing electrodes 270 and 280 compared to the first embodiment in the FIG. 4. In the second embodiment of the invention, the touch spacer 142 portion has some peaks and valleys. When the common electrode 150 and the alignment layer 160 is formed on more than two columns, the alignment layer on the top of the columns will be thinner than the other area if the alignment layer is formed using an organic material, e.g. polyimide solution. The liquid (organic material) will flow according to the peaks and valleys of the columns. Thus, the alignment layer 160 on the top of touch spacer 142 may be thinner than the other portion. This improves the detection of a touch point and improves the sensitivity of a touch event. In FIG. 5, the alignment layer is drawn to have the same thickness on the touch spacer 142, but actually the alignment layer on the touch spacer 142 may have a non-uniform thickness or thinner thickness portion or there may be no alignment layer region on the touch spacer 142. In FIG. 5, the columns of touch spacer 142 are drawn as having flat top surfaces, but in some embodiments of the invention the top surfaces of the columns may be rounded. The thickness of the alignment layer 160 may be equal to or less than 500. The alignment layer is formed using a coating made of a polymer like a polyimide, ink jet printing method, etc. Using an organic liquid material in a configuration having multiple columns allows the fluid to flow through the peaks and valleys of the columns. Thus, the thickness of the alignment layer is controlled easily which improves the touch sensitivity.

Figure 6:
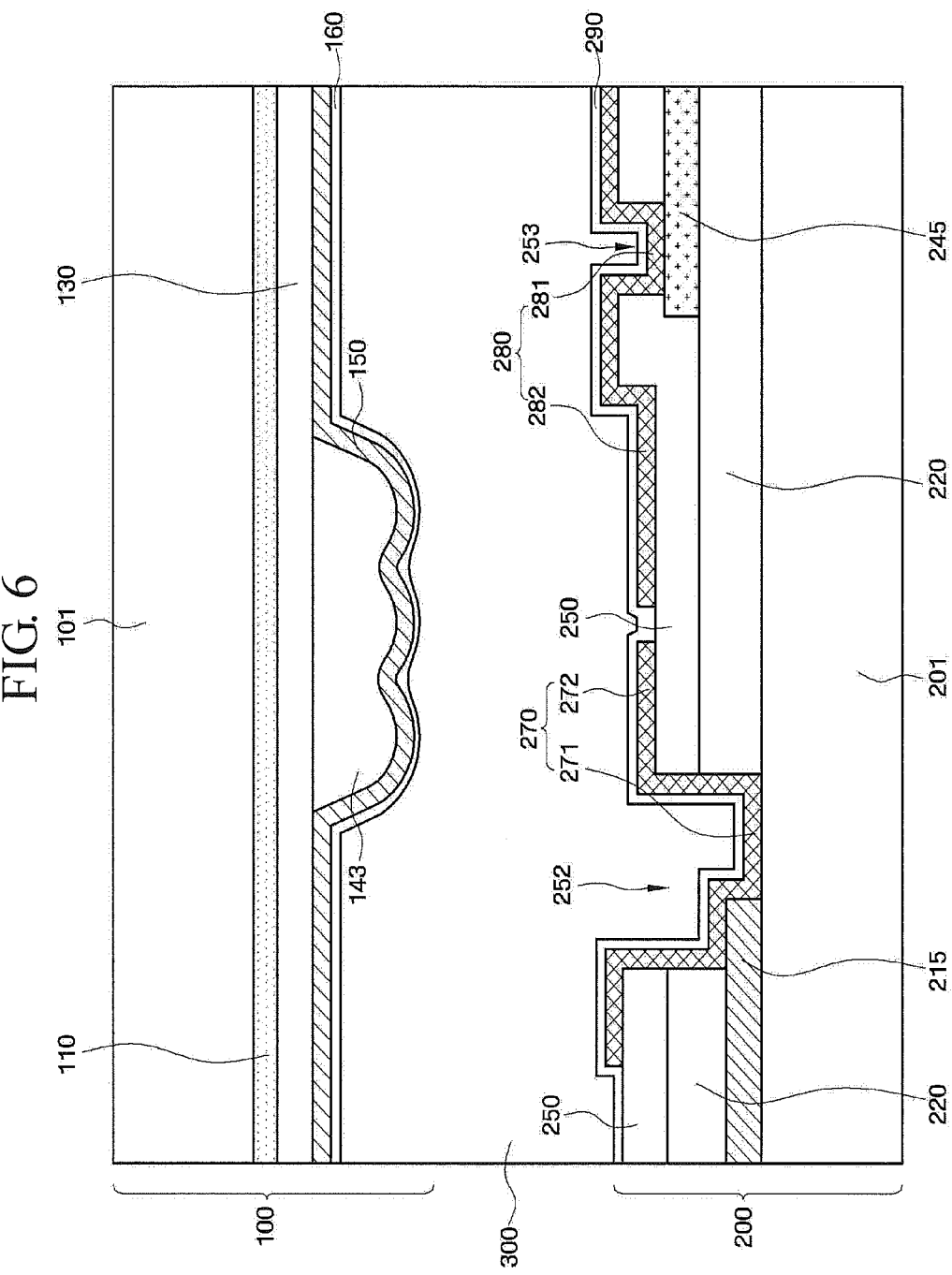
FIG. 6 is a cross-sectional view illustrating a sensing portion of a display panel according to the third exemplary embodiment of the present invention.

FIG. 6 is a cross-sectional view illustrating a sensing portion of a display panel according to the third exemplary embodiment of the present invention. Referring to the FIG. 6, the touch spacer 143 has an embossing surface. The touch spacer 143 having an embossing surface is formed and the common electrode 150 is formed thereon and the alignment layer 160 is formed. The alignment layer 161 on the embossing surface may have a different thickness according to the embossing surface of the touch spacer 143. On the convex portion (nearest to the sensing electrode in the second substrate), the alignment layer may be thinner than the concave portion of the surface of the touch spacer 143. The difference in the thickness of the alignment layer is caused from the embossing surface of the touch spacer 143. The liquid organic material will flow through the inclination of the embossing surface of the touch spacer 143. On the convex portion (the utmost portion of the touch spacer), a very thin alignment layer or no alignment layer at all remains except on the concave portion. This thinner alignment layer helps the touch spacer to better contact the sensing electrodes 270 and 280. Thus more current may flow by the contact improving the touch sensitivity. In the FIG. 6, in some embodiments of the invention there may be no alignment layer portion on the convex portion of the touch spacer.

Figure 7:
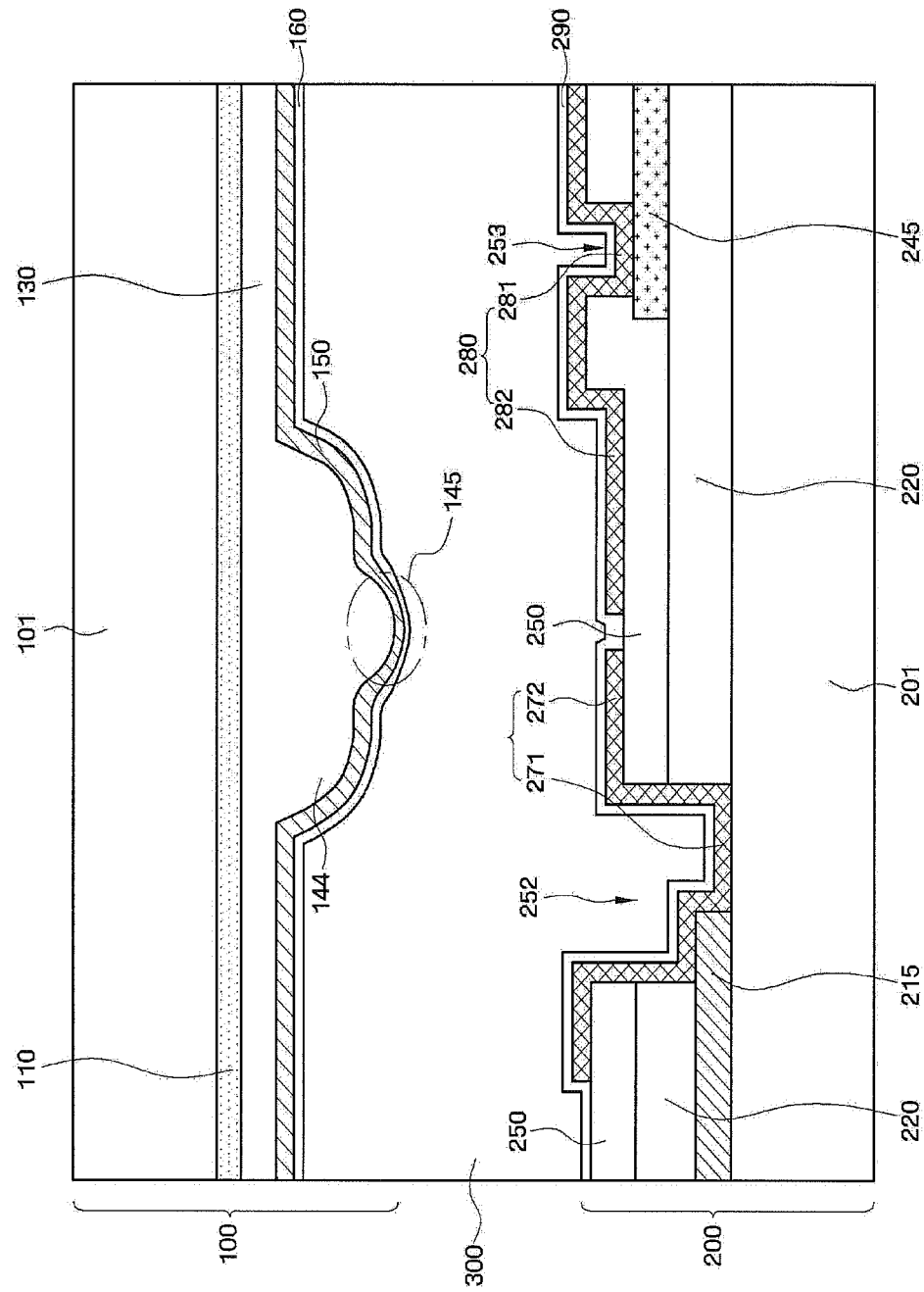
FIG. 7 is a cross-sectional view illustrating a sensing portion of a display panel according to the fourth exemplary embodiment of the present invention.

FIG. 7 is a cross-sectional view illustrating a sensing portion of a display panel according to the fourth exemplary embodiment of the present invention. Referring to FIG. 7, the touch spacer 144 in this embodiment of the invention has a protrusion on the surface. The protrusion is near the sensing electrodes 270 and 280. The protrusion may contact the sensing electrodes 270 and 280. If an organic liquid material (alignment layer material) is used as a coating, the fluid flows down through the protrusion. On the utmost surface of the touch spacer, the thickness of alignment layer 160 is thinner than other portions of the touch spacer after the organic fluid flows down through the protrusion. In other words, the thickness of layer on the protrusive touch spacer in not uniform. In other embodiments of the invention, there may be no alignment layer on the top surface of the protrusion. This thinner, non-uniform alignment layer 144 or no alignment layer 144 on the touch spacer improves the touch sensitivity. With this thinner alignment layer, a smaller pressure touch can be detected. The thickness of the alignment layer 160 on the touch spacer 144 may be 500 Å and in other portions may be larger than 500 Å.

A method for manufacturing an LCD panel according to an exemplary embodiment of the present invention is described below.

The method for manufacturing an LCD panel according to an exemplary embodiment of the present invention includes forming a first substrate (i.e., color filter array substrate) and forming a second substrate (i.e., TFT array substrate).

As shown in FIG. 3, a black matrix 110 is formed on an upper substrate 101.

The black matrix 110 is formed such that an opaque organic material layer or an opaque metal layer is deposited on the upper substrate 101 and is patterned by a photolithography process and an etching process. The black matrix 110 is formed at a predetermined width to prevent opaque metal patterns of the second substrate from being seen. The upper substrate 101 is made of a transparent insulating material such as plastic so that it can be smoothly pushed when its surface is touched.

A color filter layer 120 is formed on the upper substrate 101 having the black matrix 110 as shown in FIG. 3. The color filter layer 120 is formed such that red (R), green (G) and blue (B) color filters are sequentially formed by a photolithography method. The color filters may be formed by an ink jet method.

Next, as shown in FIG. 3, an overcoat layer 130 is formed over the whole surface of the upper substrate 101 to cover the black matrix 110 and the color filter layer 120.

The overcoat layer 130 is formed at a predetermined thickness to protect the color filter layer 120 and to obtain excellent step coverage when a common electrode 150 is formed. The overcoat layer 130 may be formed by depositing acrylic resin using, for example, a spin coating technique.

Then, as shown in FIG. 1, a touch spacer 141 is formed on the overcoat layer 130 by using a conductive polymer.

In order to form the touch spacer 141, an organic layer is deposited over the whole surface of the upper substrate 101. A photoresist is coated on the organic layer and is subjected to a light exposure process and a development process of a photolithography process to thereby form a photoresist pattern. The organic layer is patterned by an etching process using the photoresist pattern as a mask, thereby forming the touch spacer 141. The organic layer may be formed using a photosensitive organic layer without a photoresist. The organic layer may be formed by using an inkjet printing technique.

As shown in FIGS. 4, 5, 6 and 7, the touch spacer may be made in various forms. In FIG. 5, there is a need for a mask pattern that corresponds to the multiple columns for making a touch spacer having more than two columns. A UV exposure is then applied. In FIGS. 6 and 7, the touch spacer is formed by a slit mask pattern or a half-tone mask pattern.

Subsequently, as shown in FIGS. 1 and 3, the common electrode 150 is formed over the whole surface of the upper substrate 101 to cover the overcoat layer 130 and the touch spacer 141.

In more detail, a transparent conductive material layer is deposited over the whole surface of the upper substrate 101 to cover the overcoat layer 130 and the touch spacer 141 by using, for example, a sputtering technique. The transparent conductive material layer is made of a transparent conductive material such as ITO or IZO. The transparent conductive material layer is patterned into the common electrode 150 by a photolithography process and an etching process using a mask.

Next, as shown in FIGS. 1 and 3, an alignment layer is formed on the common electrode 150. The alignment layer may be made of an inorganic material or an organic material. If an organic material is used, the alignment layer can be formed using a roll coating printing method, a spin coating method, an ink jet printing method, etc. In one embodiment of this invention, an Ink jet printing method is used for controlling the thickness of the alignment layer on the touch spacer 141 and the sensing electrodes 270 and 280. On the touch spacer, the alignment layer is printed with a thickness of equal or less than 500 Å. When the alignment layer is formed by a coating method, a coated organic material is flown down through (according to) the peaks and valley of the substrate, such as on the touch spacer 141 having an embossing surface, more than two columns, or a protrusion surface. The shape of the touch spacer helps the organic fluid material flow down easily. Thus, the thickness of the alignment layer is controlled.

The steps of forming the second substrate are described below in detail with reference to FIGS. 1 and 3.

A gate metal pattern having a gate line 210, a gate electrode 211 and a first touch conductive line 215 is formed on a lower substrate 201. The gate metal pattern is formed such that a gate metal layer is deposited by a deposition technique such as a sputtering technique and is then patterned by a photolithography process and an etching process. The lower substrate 210 is made of a transparent insulating material such as glass or plastic.

The gate line 210 is formed in a first direction, and the gate electrode 211 extends from the gate line 210. The first touch conductive line 215 is formed in the first direction parallel with the gate line 210. The first touch conductive line 215 is apart from the gate line 210. For example, the first touch conductive line 215 is at a distance of about 5 μm from the gate line 210.

Then, as shown in FIG. 3, a gate insulating layer 220 is formed over the whole surface of the lower substrate 201 having the gate metal pattern by using a plasma enhanced chemical vapor deposition (PECVD) technique. The gate insulating layer 220 is formed by depositing an insulating material such as silicon nitride (SiNx) or silicon oxide (SiOx) over the whole surface of the lower substrate 201. The gate insulating layer 220 is formed to cover the gate metal pattern formed on the lower substrate 201, thereby electrically insulating the gate metal pattern.

As shown in FIG. 3, a semiconductor layer 230 includes an active layer 231. An ohmic contact layer 233 is formed on a portion of the gate insulating layer 220 over the gate electrode 211. The active layer 231 is formed such that a polysilicon layer or an amorphous silicon layer is deposited and patterned by a photolithography process and an etching process, and the ohmic contact layer 233 is formed such that a doped polysilicon layer or a doped amorphous silicon layer is deposited and patterned by a photolithography process and an etching process.

Subsequently, as shown in FIGS. 1 to 3, a data metal pattern having a data line 240, a source electrode 241, a drain electrode 243, and a second touch conductive line 245 is formed on the lower substrate having the semiconductor layer 230.

In more detail, the data metal pattern is formed such that a metal layer is deposited on the lower substrate 201 having the semiconductor layer 230 and patterned by a photolithography process and an etching process.

The data line 240 is formed to cross the gate line 210. One side of the drain electrode 243 faces the source electrode 241, and the other side is electrically connected to the pixel electrode 260 to have a wider area on one side. In some embodiments of the invention, The source electrode may be formed in a letter "U" to surround the drain electrode.

As shown in FIGS. 1 and 2, a passivation film 150 is formed over the whole surface of the lower substrate 201. First to third contact holes 251 to 253 are formed in the passivation film 250.

The passivation film 250 is formed over the whole surface of the lower substrate 201 by using a deposition technique such as a PECVD technique or a spin coating technique. The first and third contact holes 251 and 253 are formed by a photolithography process and an etching process using a mask to penetrate the passivation film 250. At the same time, the second contact hole is formed to penetrate the passivation film 250 and the gate insulating layer 220. The first contact hole 251 exposes a portion of the drain electrode 243. The third contact hole 253 exposes a portion of the second touch conductive line 245, and the second contact hole 252 exposes a portion of the first touch conductive line 215. The passivation film 250 may be formed of an inorganic insulating material such as silicon nitride (SiNx) or silicon oxide (SiOx) or an organic insulating material such as acrylic, polyimide or benzocyclobutene (BCB)

Thereafter, as shown in FIGS. 1 and 3, a pixel electrode 260 and first and second sensing electrodes 270 and 280 are formed on the passivation film 250.

More specifically, a transparent conductive material layer such as ITO, IZO or TO is deposited on the passivation film 250 by using a deposition technique such as a sputtering technique and then patterned by a photolithograph process and an etching process using a mask, thereby forming the pixel electrode 260 in a pixel region.

The first and second sensing electrodes 270 and 280 are formed on the passivation film 250 at the same height. The first and second sensing electrodes 270 and 280 are electrically connected to the first and second touch conductive lines 215 and 245 via the second and third contact holes 252 and 253, respectively. The first sensing electrode 270 includes a first electrode contact portion 271 electrically connected to the first touch conductive line 215 via the second contact hole 252 and a first electrode extending portion 272 extending toward the second contact electrode 280. The second sensing electrode 280 includes a second electrode contact portion 281 electrically connected to the second touch conductive line 245 via the third contact hole 253 and a second electrode extending portion 282 extending toward the first sensing electrode 270. The first and second electrode extending portions 272 and 282 have many opposite surfaces to each other. A plurality of first and second electrode extending portions 272 and 282 may be formed. In this instance, the first and second electrode extending portions 272 and 282 are alternately or symmetrically formed as if they engage each other. The first and second electrode extending portions 272 and 282 are formed on the passivation film 250 at the same height.

The first and second sensing electrodes 270 and 280 may be formed in a predetermined pattern form.

Next, as shown in FIGS. 1 and 3, an alignment layer is formed on the pixel electrode 260. The alignment layer may be made of an inorganic material or organic material. If an organic material is used, the alignment layer is formed using a roll coating printing method, a spin coating method, an ink jet printing method, etc. In this embodiment of the invention, an ink jet printing method is used for controlling the thickness of alignment layer on the sensing electrodes 270 and 280. On the sensing electrode, the alignment layer is printed with a thickness equal to or less than 500 Å.

Next, the first substrate and the second substrate are attached and a liquid crystal is interposed. The liquid crystal may be dropped on the first substrate or the second substrate by one drop filing method and then the two substrates may be attached.

What is claimed is:

1. A display panel, comprising:
a first substrate;
a touch spacer on the first substrate;
a common electrode on the touch spacer;
a second substrate opposing the first substrate;
a sensing electrode facing the touch spacer on the second substrate;
an alignment layer on the sensing electrode or the touch spacer,
wherein the alignment layer has a non-uniform thickness,
wherein the nearest portion of the touch spacer to the sensing electrode has a thinner alignment layer than other portions of the alignment layer.

2. The display panel of claim 1, wherein there is no alignment layer region on the touch spacer.

3. The display panel of claim 2, wherein the touch spacer facing the sensing electrode has at least two columns.

4. The display panel of claim 2, wherein the touch spacer has an embossing surface.

5. The display panel of claim 2, wherein the touch spacer has a protrusion portion on the surface.

6. The display panel of claim 1, wherein the touch spacer facing the sensing electrode has at least two columns.

7. The display panel of claim 1, wherein the touch spacer has an embossing surface.

8. The display panel of claim 1, wherein the touch spacer has a protrusion portion on the surface.

* * * * *